Patented Jan. 26, 1943

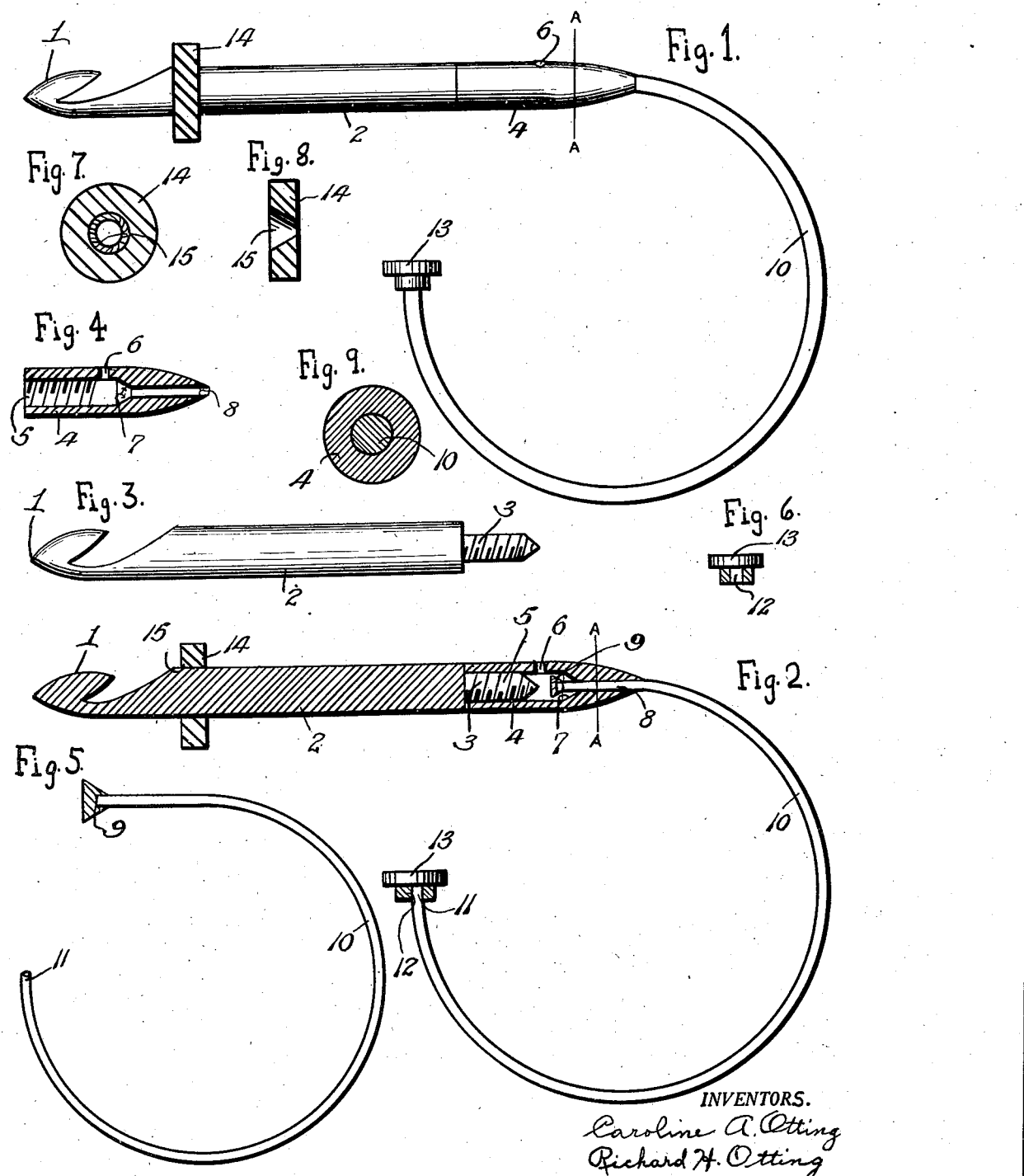

2,309,528

UNITED STATES PATENT OFFICE 2,309,528

CONTINUOUS STITCH NEEDLE

Caroline A. Otting and Richard H. Otting, New York, N. Y.

Application June 22, 1939, Serial No. 280,538

3 Claims. (Cl. 66—117)

The invention relates to improvements in a hand operated needle for making seamless articles in a continuous stitch in greater widths than has ever been known or possible before by a hand operated needle. The arts with which the needle is most nearly related are the hand knitting and hand crocheting arts. The needle has characteristics of both arts, but is neither one; it is a vehicle by which a new art shall be created.

One of its objects is to provide a continuous stitch needle with a hooked spindle body affixed to a tapered lubricated bearing housing forming a hooked movable spindle rotatably mounted on a flexible shaft, said shaft being inserted through the shaft sleeve or guide of the tapered lubricated bearing housing aligning the flexible shaft with the hooked movable spindle, a bearing being affixed to the flexible shaft engaging against the bearing seat of the tapered lubricated bearing housing joining the hooked movable spindle with the flexible shaft. The needle is provided with a permanent stitch stop affixed to the free end of the flexible shaft to prevent loops of yarn from slipping off the flexible shaft end of the needle. Another object of the invention is to provide an oil hole as a means of lubricating the movable parts of the needle. A further object of the invention is to provide a removable stitch stop to be employed when there is a stoppage of operation to prevent loops of yarn, remaining on the needle, from slipping off the hooked end of the needle.

The above and other objects that may appear are attained by a means of construction and an arrangement of parts that will now be described, reference for this purpose being had to the accompanying drawing in which the needle has been illustrated and in which:

Figure 1 is a plan view of the needle; Figure 2 is a cross sectional view of the needle; Figure 3 is a plan view of the hooked spindle body; Figure 4 is a cross sectional view of the tapered lubricated bearing housing; Figure 5 is a cross sectional view of the bearing and a plan view of the flexible shaft; Figure 6 is a cross sectional view of the female connection and a plan view of the base of the permanent stitch stop; Figure 7 is a plan view of the removable stitch stop; Figure 8 is a cross sectional view of the removable stitch stop; Figure 9 is a cross sectional view of the movable spindle through the shaft sleeve or guide and the flexible shaft at line A—A.

Hook 1 is similar to the type hook used in the crocheting art; it is part of the spindle body 2 and is used to grasp the yarn or thread. Spindle body 2 is used as a handle or the means by which the hook 1 is manipulated to grasp the yarn or thread and rotate the hooked movable spindle on the flexible shaft 10. The spindle body 2 and the tapered lubricated bearing housing 4 are the same size where they join; the male thread 3 and the female thread 5 are the means by which the spindle body 2 and the tapered lubricated bearing housing 4 are affixed, forming the hooked movable spindle. The tapered lubricated bearing housing 4, past oil hole 6, tapers to the size of flexible shaft 10 to enable the yarn to glide freely from the flexible shaft 10 onto the hooked movable spindle. The oil hole 6 is between female thread 5 and bearing seat 7, with enough clearance for bearing 9, to permit the application of a lubricant to the bearing seat 7, bearing 9, shaft sleeve or guide 8 and flexible shaft 10. The bearing seat 7 and bearing 9 taper giving more surface engagement between the hooked movable spindle and flexible shaft 10 where they join. The shaft sleeve or guide 8 centers from the bearing seat 7 through to the tapered end of the tapered lubricated bearing housing 4, fitting snugly but movably on the flexible shaft 10 to freely rotate the hooked movable spindle on its axis, the flexible shaft 10. Shaft sleeve or guide 8 aligns the hooked movable spindle with the flexible shaft 10 to enable the yarn to glide freely from the flexible shaft 10 onto the hooked movable spindle. The flexible shaft 10 is inserted through the shaft sleeve or guide 8 and is prevented from slipping out of the shaft sleeve or guide 8 by the bearing 9 affixed on its joining end by engaging against the bearing seat 7. The male connection 11 on the free end of the flexible shaft 10 is affixed into the female connection 12 of the permanent stitch stop 13. The permanent stitch stop 13 prevents loops of yarn from slipping off the flexible shaft end of the needle. The removable stitch stop 14 is circular and in its center is a conically shapped hole 15 which is slipped over hook 1 and held on the hooked spindle body 2 by friction. The removable stitch stop 14 is only employed when there is a stoppage of operation to prevent loops of yarn, remaining on the needle, from slipping off the hooked end of the needle.

The invention is used by making a chain stitch the desired width of the article, then, inserting the hooked end of the needle through each chain stitch putting the yarn over the needle and drawing it through the chain stitch, holding the loop on the needle, continuing drawing the yarn through each chain stitch until there are as many loops on the needle as there were chain stitches made. To remove the loops from the needle, put the yarn over the hooked end of the needle and draw it through one loop, then, put the yarn over the needle again, drawing it through two loops, repeat, putting the yarn over the hooked end of the needle drawing it through two loops until only one loop remains on the needle, as the last loop on the needle is the first stitch of the next row. From this beginning knitting art stitch appearances can be duplicated and numerous balls of yarn can be used at the same time (because the work is not reversed at the end of each row as is common to the knitting and crocheting arts, the right side of the work is always facing the operator), thus, enabling the making of portraits, sceneries and all other designs in rugs, bedspreads, curtains, draperies, wall hangings, blankets (e. g., full size blankets 72 inches by 84 inches or larger), and in almost any garment such as coats, sweaters, dresses, beach and bath robes, ski, snow and bathing suits, baby buntings carriage covers, etc. The invention produces a much more tightly woven and firmer fabric than do the knitting or the crocheting arts.

The invention can be used with wool, silk, cotton, rayon, linen, hemp or any mixtures thereof, or anything which can be made into yarn or strips.

We are aware that prior to our invention hooks similar to hook I have been used for centuries. We, therefore, do not claim hook I broadly; but

We claim:

1. A continuous stitch needle comprising a hooked spindle body, a flexible shaft, a tapered lubricated bearing housing, detachably secured to said spindle body and having a sleeve or guide portion to receive said flexible shaft, a bearing seat within said housing, a bearing fixed to one end of said shaft engaging said bearing seat, whereby said shaft is aligned and rotatably joined with said spindle body, and a permanent stitch stop attached to the free end of said shaft to prevent loops of yarn from slipping off same.

2. A continuous stitch needle comprising a hooked spindle body, a flexible shaft, a tapered lubricated bearing housing detachably secured to said spindle body and having a sleeve or guide portion to receive said flexible shaft, a bearing seat within said housing, a bearing fixed to one end of said shaft engaging said bearing seat, whereby said shaft is aligned and rotatably joined with said spindle body, an oil hole in said housing, whereby lubrication is applied to the movable parts within said housing, and a permanent stitch stop attached to the free end of said shaft to prevent loops of yarn from slipping off same.

3. A continuous stitch needle comprising a removable stitch stop, a hooked spindle body, a flexible shaft, a tapered lubricated bearing housing detachably secured to said spindle body and having a sleeve or guide portion to receive said flexible shaft, a bearing fixed to one end of said shaft engaging said bearing seat, whereby said shaft is aligned and rotatably joined with said spindle body, an oil hole in said housing, whereby lubrication is applied to the movable parts within said housing, a permanent stitch stop attached to the free end of said shaft to prevent loops of yarn from slipping off same, and said removable stitch stop detachably secured by friction to said spindle body and used only when there is a stoppage of operation to prevent loops of yarn from slipping off the hooked portion of the needle.

CAROLINE A. OTTING.
RICHARD H. OTTING.